United States Patent
Asher

Patent Number: 5,707,576
Date of Patent: Jan. 13, 1998

[54] PROCESS FOR THE FABRICATION OF COMPOSITE HOLLOW CROWN-STIFFENED SKINS AND PANELS

[75] Inventor: Don L. Asher, Broken Arrow, Okla.

[73] Assignee: Boeing North American, Inc., Seal Beach, Calif.

[21] Appl. No.: 475,696

[22] Filed: Jun. 7, 1995

Related U.S. Application Data

[62] Division of Ser. No. 317,452, Oct. 4, 1994, Pat. No. 5,622,733.

[51] Int. Cl.⁶ .................................................. B29C 3/10
[52] U.S. Cl. ...................... 264/258; 264/241; 264/257; 264/313; 264/314
[58] Field of Search ........................ 264/209.6, 571, 264/547, 510, 511, 516, 313, 314, 320, 258; 156/196, 210, 245, 198; 52/785, 745, 797, 799; 160/89, 113, 114, 115, 119

[56] References Cited

U.S. PATENT DOCUMENTS

| | | | |
|---|---|---|---|
| 3,641,230 | 2/1972 | Jenks | 264/152 |
| 3,819,466 | 6/1974 | Winfield et al. | 161/89 |
| 3,995,080 | 11/1976 | Cogburn et al. | 428/355 |
| 3,995,081 | 11/1976 | Fant et al. | 428/119 |
| 4,631,221 | 12/1986 | Disselbeck et al. | 428/166 |
| 4,853,172 | 8/1989 | Jacaruso et al. | 264/571 |
| 4,946,526 | 8/1990 | Petty-Galis et al. | 156/155 |
| 5,451,377 | 9/1995 | Asher et al. | 428/167 |

*Primary Examiner*—Merrick Dixon
*Attorney, Agent, or Firm*—Charles T. Silberberg; Lawrence N. Ginsberg; Terrell P. Lewis

[57] ABSTRACT

A process for forming composite hollow crown stiffened skins and panels in which a first layer or skin is placed on a forming surface of a female mold and, after forming a plurality of U-shaped stiffener elements in the first skin, a second skin is placed over the first skin, whereupon the resulting assembly is prepared for autoclave curing. The stiffener elements are formed by pressing the first skin into U-shaped depressions in the female mold surface and inserting a hollow, expandable rubber mandrel into each of the depressions on top of the first skin. Valve stems in the mandrels enable maintaining the pressure inside at atmospheric pressure. The mandrels are maintained in their "pressurized" state during subsequent formation and autoclave curing steps.

3 Claims, 3 Drawing Sheets

PROCESS FOR THE FABRICATION OF COMPOSITE HOLLOW CROWN-STIFFENED SKINS AND PANELS

This is a divisional of application Ser. No. 08/317,452 filed on Oct. 4, 1994, now U.S. Pat No. 5,622,733.

BACKGROUND OF THE INVENTION

1. Field of the Invention

The present invention relates to the fabrication of composite structural units, and more particularly to a method for fabricating stiffened composite panel structures possessing hollow stiffener elements, where fabrication and curing of the panel structures is accomplished using hollow, fluid filled, expandable mandrels.

2. Description of the Related Art

With the increasing use of composite materials in the manufacture of aircraft components, a number of problems have arisen in connection with the application of such materials to design principles developed for conventional aluminum or titanium construction. Most of these problems center about the difficulty in interconnecting one component to another, and involve the use of mechanical fasteners.

The currently-known advanced composite materials do not readily lend themselves physically or economically to extensive use of mechanical fasteners nor to very complex designs. The inclusion of multiple details in a composite material component increases the cost of manufacture to unacceptable levels and makes the application of automated procedures difficult, if not impossible. Mechanical fasteners are not physically well-suited to composite material components, and their use with such components tends to detract from the advantages of the unidirectional properties of advanced composite fibers. These problems have created a need for developing new techniques for economically producing composite material components, especially such components that are required to be load resisting.

In recent years, there have been a number of innovations in the structure and manufacture of composite material components. Some of these involve the use of thermosetting adhesives instead of mechanical fasteners.

Manufacturing processes that use thermosetting adhesives generally require the separate forming and curing of the components and a further heating process to set the adhesives. Such multiple step processes have the disadvantage of being time consuming and expensive to carry out.

Other processes involve the separate forming of elements of a component and the curing together of the elements to form the desired structure. A serious problem encountered in both approaches, i.e., bonding by adhesives and bonding by curing, has been the tendency for one part of the component to be peeled away from an adjacent part when the component is subjected to stress forces. Recent proposals for overcoming such peeling tendencies have the disadvantage of being quite complicated and expensive to carry out.

Aircraft components which have been formed from composite materials are disclosed by U.S. Pat. No. 3,995,080 to Cogburn et al., and U.S. Pat. No. 3,995,081 to Fant et al. These patents disclose a composite material structural beam with a fairly complex design that is described as being peel-resistant. Each of the elements of the beam is formed separately, and then the elements are assembled and cured together to form the beam. The use of a destructible mandrel in the curing process is described.

Integrally stiffened structural shapes, fabricated by the lamination and resin polymerization or curing of resinous, filament reinforced composite materials, have typically taken the form of J-section and I-section structures. These designs have proven to be the most readily producible, but with great difficulty. For one thing, too many tooling variables must be considered; for another, it is clearly not cost effective to produce a J-section or I-section integrally stiffened structure in one cure cycle.

Therefore, a great need has arisen for a method of readily producing stiffened, fiber-reinforced composite structures useful in the construction of integrally stiffened components for aerospace applications which are cost and labor efficient, and which save time in the fabrication process.

OBJECTS AND SUMMARY OF THE INVENTION

In view of the foregoing, it is a principal object of the present invention is to provide a process for forming a fiber-reinforced composite panel structure which includes hollow stiffener elements positioned between inner and outer mold line skins, where the stiffener elements and the skins of the structure are secured to one another in a single curing operation, and in which hollow, expandable, rubber mandrels inflated by pressurized gas provided during autoclave operation are used in the forming and curing process.

Another object of the present invention to provide a method of producing stiffened, fiber-reinforced, composite panel structures in which the fabrication of the panel structures is accomplished using hollow, fluid filled, rubber, expandable mandrels such that the total number of steps required to complete the finished products is substantially reduced.

Still another object of the present invention is to provide a fiber-reinforced composite panel structure which is significantly easier, yet less costly, to produce than fiber-reinforced composite structures heretofore known in the prior art.

These and other objects are achieved by the process of the present invention in which a first layer or skin is placed on a forming surface of a female mold and, after forming a plurality of U-shaped stiffener elements in the first skin, a second skin is placed over the first skin, whereupon the resulting assembly is prepared for autoclave curing.

The plurality of U-shaped stiffener elements are formed by pressing the first skin down into U-shaped depressions provided in the female mold surface and inserting a bladder-like, expandable mandrel into each of the depressions on top of the so-deformed first skin. Most preferably, the U-shaped stiffener elements are parallel with one another and the formation of the stiffener elements are facilitated by the provision of parallel depressions.

Valve stems, attached to and integral with the mandrels, enable maintaining the pressure inside the mandrels at an internal pressure of 14.7 psi (atmospheric pressure). The mandrels are placed in the mold, with the valve stems protruding through the mold wall. Before attaching the second skin atop the first skin, the valve stems are sealed off against the outer mold surface, so that the mandrels can be maintained in their "pressurized" state during subsequent formation steps.

The resultant panel structure is then covered with bagging materials to which a vacuum is applied. During autoclave curing of the panel structure, the pressure in the autoclave (normally 45 to 90 psi) is transferred to the mandrels and causes them to inflate, thus imparting pressure to the panel structure both from the outside as well as from the inside.

DETAILED DESCRIPTION OF THE PREFERRED EMBODIMENTS

Structures of the present invention are advantageous in that they utilize high strength, low weight, filament reinforced, composite material in which high tensile strength filaments (fibers) are used as the load bearing material with the reinforcements embedded in a polymeric, organic resinous matrix or matrices.

As used herein, high strength is defined as including tension, compression and shear strength. Peel-resistant characteristics of structures of the invention facilitate a high degree of structural integrity in the ultimately formed component.

The present invention relates to integrally embodied or attachable structural shapes of laminated, filament (fiber) reinforced, composite, resinous materials and a method for making the same. In particular, the invention embraces an integrally embodied stiffener having anisotropic properties which uses directionally arranged high tensile strength and compression load bearing filaments as reinforcements to a resinous matrix of lower strength characteristics so that weight savings are effected by orienting the reinforcements as necessary to accommodate designed-to loadings.

The panel structure formed by following the steps of the method of the present invention includes a plurality of hollow, channel-like longitudinal stringers or stiffeners which are spaced apart from one another and which may or may not extend parallel to one another. In one embodiment of the invention, the panel structure is substantially planar; in another embodiment of the invention, the panel structure may be formed with curvature, either simple or complex.

Figure 1:
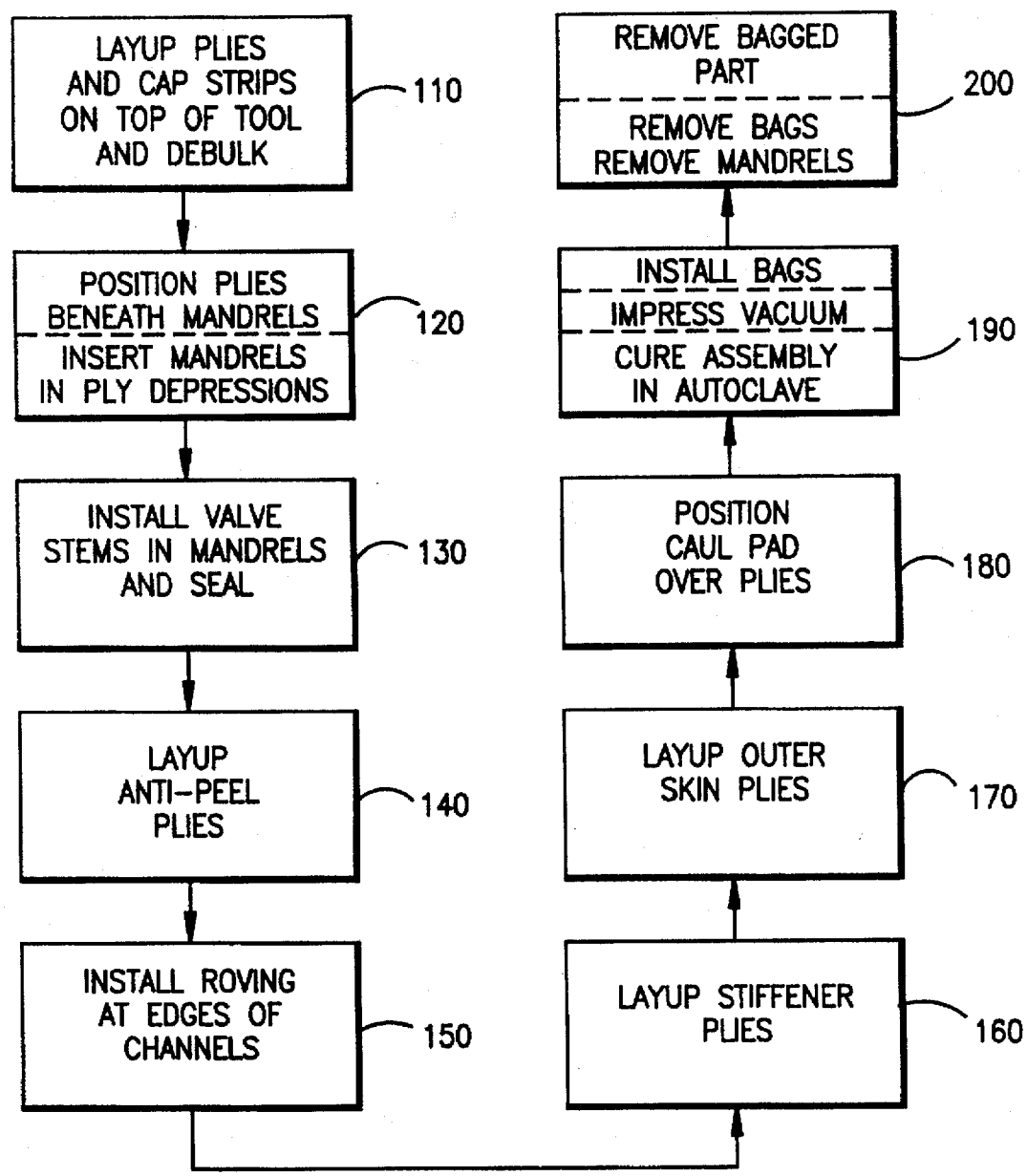
FIG. 1 is a block diagram showing the sequence of steps contemplated in the practice of the method of the present invention.
Figure 2:
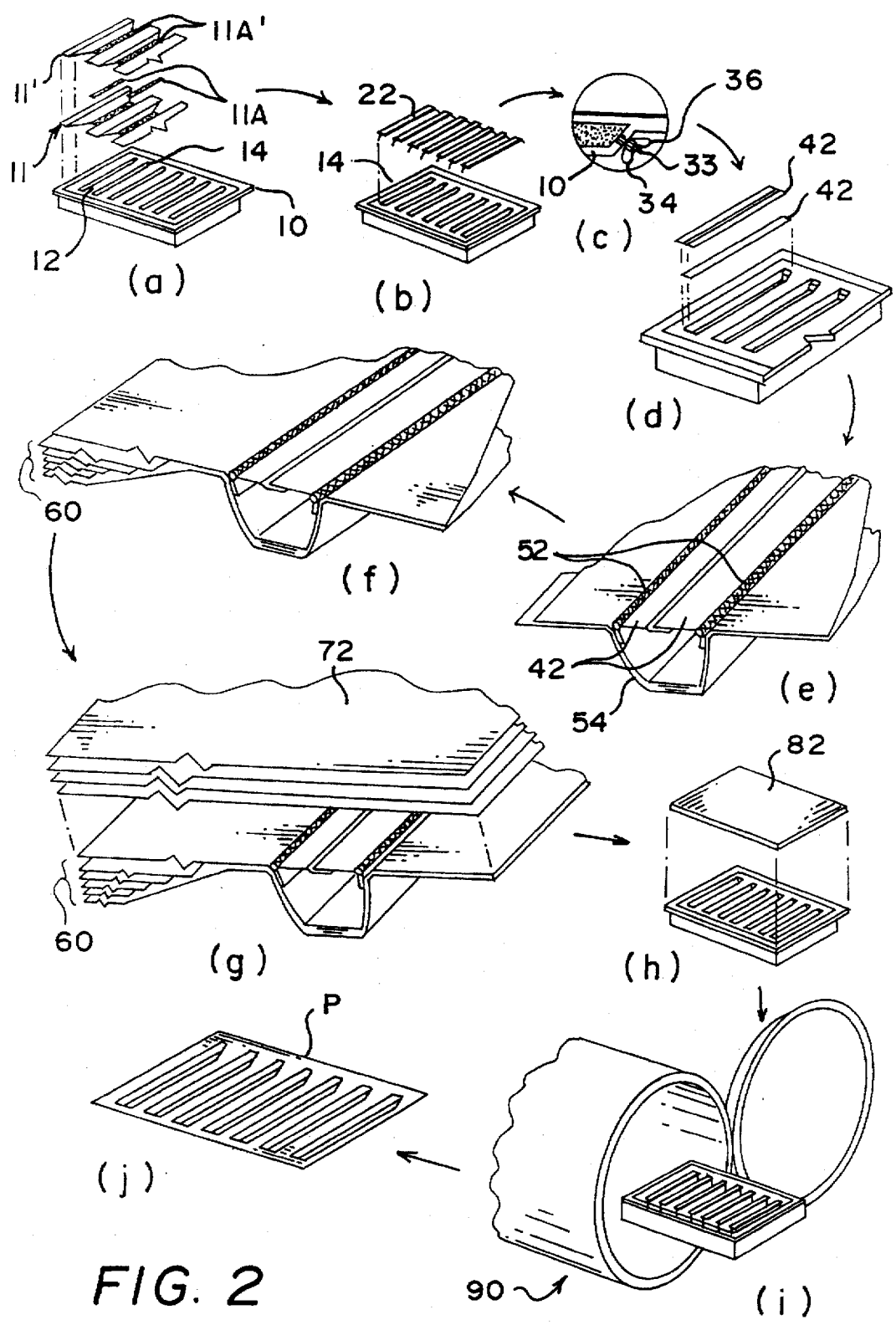
FIG. 2(a)–2(j) depict the evolution of structure that takes place in accordance with the teachings of the present invention when following the sequence of steps shown in FIG. 1.

Reference should now be made to FIGS. 1 and 2. The flow chart of FIG. 1 illustrates the sequence of steps involved in performing the method of the present invention. FIG. 2 presents various views showing a corresponding sequence of events taking place and/or structures being formed during performance of the method of the present invention.

In the first step of the method, represented by block 110 in FIG. 1, a first ply 11 of fiber-reinforced composite material is laid over the top forming surface 12 of a female bond tool 10 (see view (a) of FIG. 2). The forming surface of the bond tool is preferably rectangular in shape and made of a metal or composite material. The forming surface 12 includes a plurality of depressions or grooves 14, arranged substantially parallel to one another, and which are used in the formation of the stiffeners in the final panel product. The depressions 14 extend along a first direction (e.g., the width) of the tool forming surface 12 from substantially adjacent one edge thereof to substantially adjacent the other edge, and are substantially equidistantly spaced along a direction substantially normal to the first direction (e.g., the length). Each depression has a trapezoidal cross section and comprises arcuate sidewalls and a planar bottom surface. The bond tool is placed on a support with the depressions opening outwardly and upwardly as shown in view (a).

In the first step 110 of the method, IML ply 11 is laid upon and across the forming surface 12 of the tool. This IML ply is then vacuum debulked, a process well-known in the art. Next, cap strip plies 11A are placed on top of the IML ply within each depression or groove 14 in the forming surface 12. In view (a) of FIG. 2, two cap strip plies are shown; the number of cap strip plies used would, of course, depend on the panel design and intended application. The IML ply is made up of a fabric having fiber orientations of 0° and 90°. The cap strips placed within the depression 14 are composed of prepreg material having reinforcing fibers extending in the direction, and along the longitudinal axis, of depression 14. The fiber reinforcement is commonly known as "uni-directional reinforcing". All other plies laid up over the bond tool are composed of a fabric which is substantially similar to the IML ply. It is to be understood that the plies can be fabric or uni-directional reinforcing tape.

In this first step, at least one other IML ply 11' (including cap strips 11A') is laid over the entire female bond tool. This ply covers, as a single sheet, all of the depressions 14 in the tool. Following the addition of each additional IML ply, a vacuum debulking procedure is implemented to make sure that all gas and bubbles and volatiles have been removed from between the layers.

View (b) of FIG. 2 shows the second step of the method (represented by block 120 in FIG. 1) in which the female bond tool with various plies is positioned beneath a plurality of expandable mandrels 22. Each of the mandrels comprises an elongated hollow rubber container having a longitudinal axis which corresponds with the longitudinal axis of a respective one of the depressions 14 with which it is associated. Each of the expandable mandrels 22 is positioned over a respective groove 14 and pressed against the plies to deform the plies against, and into regions resembling, the grooves.

The mandrels 22 are preferably made of a highly expandable rubber composition. One exemplary material is silicon; another is a composition provided with a silicon coating. Most preferably the material is a substance which will not stick to adjacent plies of the composite material.

Step 130 of the process of FIG. 1 (shown in view (c) of FIG. 2) entails the installation of a valve stem 33, attached to an expandable mandrel, through an opening 34 in the female bond tool 10. The valve stem, threaded on its exterior surface, allows a wing nut 36 to be threaded onto the stem and into abutting engagement with an outer surface of the female bond tool. The nut is torqued just enough to pull the stem through the opening 34 and in so doing create an airtight seal between the mandrel and the tool.

In step 140 of the process (see view (d) of FIG. 2), anti-peel plies 42 (two are shown in view (d)) are placed laterally of the mandrel 22 along its longitudinal axis. These anti-peel plies are laid over opposite edges of the mandrel width with one pair of adjacent edges overlapping on the top of the mandrel and the opposite pair of adjacent edges extending down into the depressions along the sides of the mandrels.

In step 150 of the process (shown in view (e) of FIG. 2), roving strips 52 are placed in the longitudinally extending channels 54 immediately adjacent the lateral extent of the anti-peel plies which have been disposed atop the mandrel. The roving strips comprise uni-directional or woven fabric tape which has been rolled up in a direction transverse to the longitudinal axis of the tape. The roving strips may be rolled into a structure resembling a straw with a helical interior.

The forming surface 12 of the female bond tool has a substantially central section that is substantially planar, with the depressions 14 disposed in parallel spaced relationship across one dimension. Arranged around the periphery of the substantially central section is a surface region which is of less height than the height of the central portion. The depressed peripheral region enables formation of a thickened peripheral region on the component. The purpose of the thickened peripheral region is to provide reinforcement for the attachment of the component to its underlying structure when the component is ultimately used.

Step 160 of the method (shown in view (f) of FIG. 2), involves the placement of additional, stiffener plies 60. Each of the stiffener plies have the configuration of a picture frame. The successive overlapping plies are sized, one relative to another, such that each newly laid ply is laid in sequence on top of the previously-laid ply. Each successive ply laid on top of the previous ply has exterior dimensions substantially the same as the previous ply, but includes a window or opening which is smaller than the previous ply. The windows of the stiffener plies encompass the central planar portion of the female bond tool.

In the next step 170 of the method of FIG. 1 (shown in view (g) of FIG. 2), outer skin plies 72 (OML, or outer mold line plies) are placed over the previously built up ply structure and, as in the preceding step, a vacuum debulking procedure is followed. The outer skin plies 72 are disposed atop the assembled ply structure in such a manner as to entirely encompass the underlying assembled ply structure.

In the next step 180 of the method (shown in view (b) of FIG. 2), a caul pad 82 is placed atop the outermost skin ply of the OML plies. The caul pad is composed of a material with a hard, smooth surface that engages against the outermost skin ply of the OML plies. The purpose of this smooth surface is to give the outermost skin ply an aerodynamically smooth and efficient surface.

Next, in step 190 (shown in view (i) of FIG. 2), the assembly of plies and caul pad is bagged in a conventional manner for curing in an autoclave 90, and a vacuum is impressed on the bagged assembly prior to its being placed inside the autoclave. The autoclave is operationalized with pressure, normally created by pumping in inert gas, generally nitrogen, to a pressure of 45 to 90 psi, as well as with temperature, most generally in the range of 250° F. to 350° F. The part is then cured (a function of time), during which the pressure in the autoclave is transferred to the mandrels and causes them to inflate, thus imparting pressure to the panel structure both from the outside as well as from the inside.

The last step 200 of the method (shown in view (j) of FIG. 2) entails removing the component P from the autoclave after curing has been completed. The vacuum bagging is then removed from the component and tool. The component is then removed from the bond tool. The rubber mandrels are then removed from the inside of the depressions.

The remaining portion of the application will be devoted to a description of the physical structure or component which is produced by this method.

Figure 3:
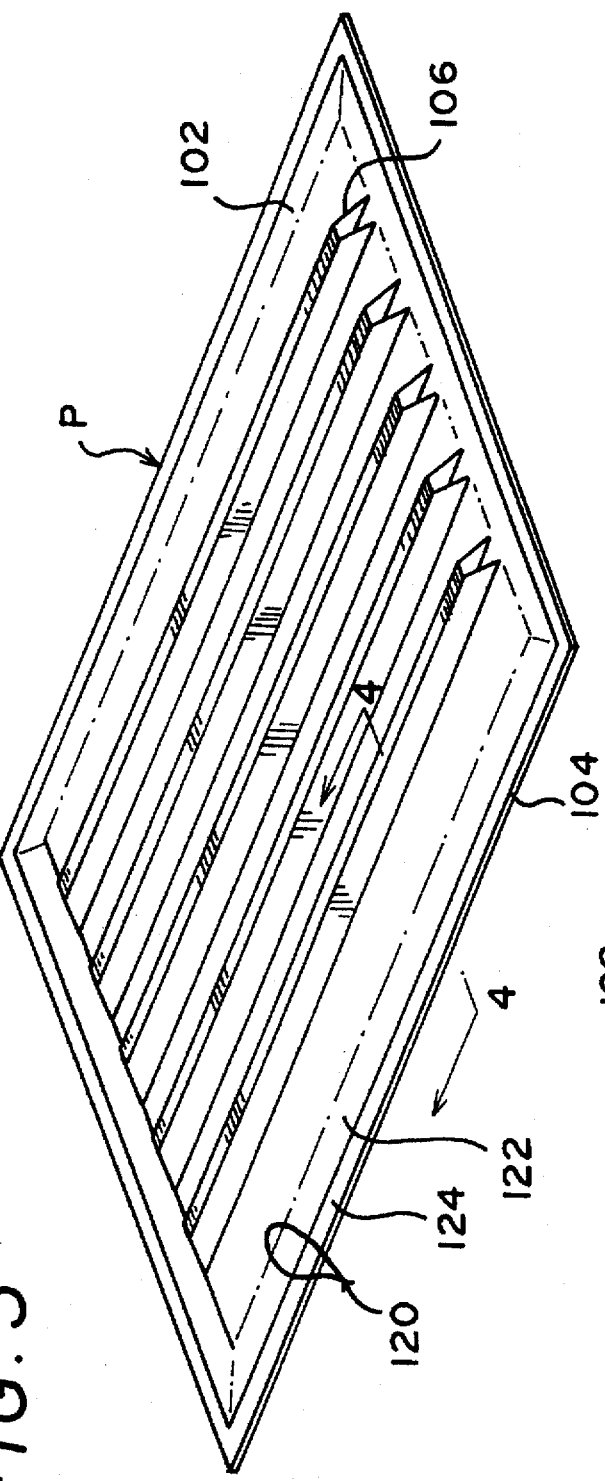
FIG. 3 is a perspective view of the panel formed by practice of the method of the present invention.
Figure 4:
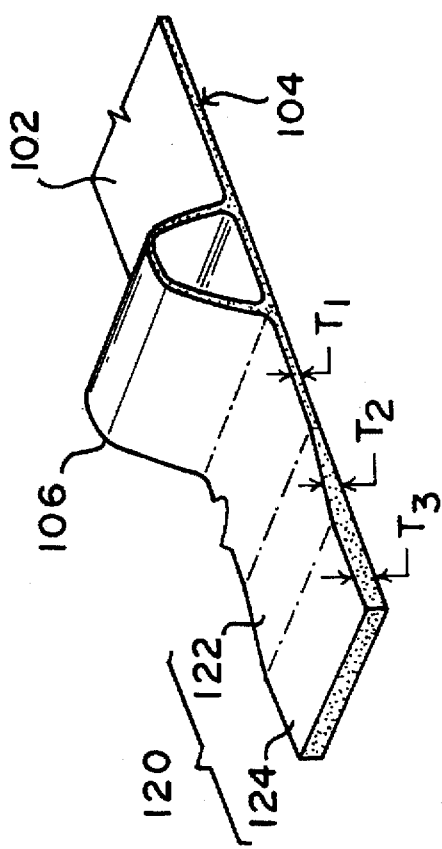
FIG. 4 is a partial sectional view of the panel shown in FIG. 3.

Referring to FIGS. 3 and 4, the panel structure P formed by the method of the present invention includes a first, inner mold line (IML) skin 102 (having an exterior substantially smooth surface), a second, outer mold line (OML) skin 104 (having a substantially aerodynamically smooth exterior surface), and a plurality of U-shaped, parallel, stiffener elements 106 disposed between the inner and outer skins. The elements 106 extend between opposite edge regions of the panel, which extend about the exterior periphery of the panel and define a dual-thickness portion 120.

The portion of the panel adjacent the stiffeners has a first thickness T1. The dual-thickness portion 120 includes one width 122 having a second thickness T2 and another width 124 having a third thickness T3. The width 122 extends between the panel interior and the panel width 124. The thickness T3 is greater than the thickness T1 of the panel interior, and the thickness T2 varies in dimension from thickness T1 to thickness T3.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A method for forming a unitary panel structure from fiber-reinforced composite material, comprising the steps of:

(a) forming a first subassembly on a tool, said first subassembly including a first skin and a plurality of channel-shaped elements, the channel-shaped elements being disposed atop the skin and being aligned with one another, said channel-shaped elements having inflatable mandrels disposed therein and secured to a surface of said tool, the channel-shaped elements and the first skin comprising said composite material, (b) forming a second assembly comprising the first subassembly and a second skin of composite material, the first and second skins being disposed on opposite sides of said channel-shaped elements, and (c) inflating said mandrels while curing said second subassembly in an autoclave at a temperature not greater than 350° F. to form a unitary, one-piece panel structure.

2. The method of claim 1, wherein said step of forming a first subassembly further comprises providing said tool which has channel-shaped depressions on said molding surface, and pressing said first skin into said channel-shaped depressions before securing said mandrels in said depressions.

3. The method of claim 2, wherein said step of forming said first subassembly further includes disposing said expandable mandrels over the deformed first skin in alignment with said depressions.

* * * * *